Patented June 14, 1949

2,472,868

UNITED STATES PATENT OFFICE 2,472,868

STABILIZED AROMATIC COMPOUNDS AND METHODS OF OBTAINING THE SAME

Edward W. Tillitson, Grosse Pointe, Mich., assignor to Parke, Davis & Company, Detroit, Mich., a corporation of Michigan No Drawing. Application June 4, 1945, Serial No. 597,599

19 Claims. (Cl. 260—619)

The invention relates to stabilization of cyclic aromatic compounds containing one or more ring carbon atoms to which are attached substituents of the class hydroxy and amino groups, including substituted amino groups.

More particularly, the invention relates to compositions containing amino- and/or hydroxy-substituted carbocyclic aryl compounds stabilized against discoloration or oxidation, or other undesired chemical and physical deterioration or alteration, by means of relatively small amounts of iminoaminomethanesulfinic acid compounds of the general formula,

or their tautomeric forms, represented by the formula,

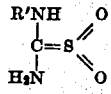

where R' is a member of the class hydrogen and lower alkyl radicals.

The cyclic aromatic compounds, and compositions containing the same, which I have found to be stabilized by the above mentioned imino-aminomethanesulfinic acid compounds are those carbocyclic compounds having an aromatic nucleus such as the benzene, naphthalene, anthracene, phenanthrene, and like nuclei.

Hydroxy and/or amino groups are attached to the ring nuclear carbon atoms of the compounds to be stabilized. Such amino or hydroxy compounds may additionally carry non-oxidizing groups directly or indirectly substituted into their nuclei which do not interfere with the stabilizing action of the iminoaminomethanesulfinic acid compounds mentioned. Such additional non-oxidizing substituting groups are, for example, halogens (Hal), hydrocarbon radicals (R—) such as alkyl, aralkyl, aryl, alkaryl, cycloalkyl, and the like, ether radicals (—OR, where R is a hydrocarbon radical such as already mentioned); ketone oxygen (=O), hydroxyl (—OH), sulfhydryl (—SH), amino groups (—NH₂), substituted amino groups (—NHR and —NRR), (where the R groups are as already defined and may be the same or different hydrocarbon radicals), acylamino (—NH acyl), sulfonic acid groups, (SO₃X, where X is hydrogen or a salt-forming group or radical) and carboxylic acid radicals (—COOX, where X is hydrogen, alkyl or a salt-forming group or radical).

Examples of compounds which are stabilized by the above mentioned compounds of formula

R'NH
|
HN=C—SO₂H are the following.

o, m, and p-Cresol
o, m, and p-Ethyl phenol
o, m, and p-Propyl phenol
o, m, and p-Isopropyl phenol
o, m, and p-Butyl phenol
Xylenols
Trimethyl phenols
o, m, and p-Phenyl phenols
Halogenated phenols
α-Hydroxy-β-methylethylamino-3-hydroxy benzene
o, m, and p-Alkoxy-phenols
o, m, and p-Phenoxy phenols
Halogenated phenoxy phenols
Benzyl phenol
3-chloro-4-hexyl phenol
6-chloro-o-xenol
2-chloro-p-xenol
3-chloro-4-hydroxy diphenyl
α and β-Naphthols
α and β-Naphthol sulfonic acids
Catechol
Guaiacol
Tert. butyl catechol
Eugenol
Isoeugenol
Ortho eugenol
Urushiol
Morphine
Apomorphine
Morphol
Methyl catechol
Epinephrine (methyl amino ethanol catechol)
α-Keto-β-methylamino-m, p-dihydroxy ethylbenzene and its salts with acid reacting substances
Diisopropyl catechol
Phenyl catechol
Benzyl catechol
α,β-Dihydroxy naphthalene
Leuco alizarin
Alizarin,

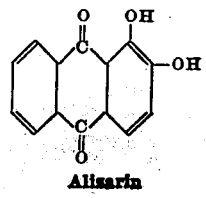

Alizarin

Resorcinol
Methyl resorcinol
Ethyl resorcinol
Propyl resorcinol
Butyl resorcinol
Isobutyl resorcinol
Amyl resorcinol
Hexyl resorcinol
2-ethyl hexyl resorcinol
Diisobutyl resorcinol
Capryl
3-chloro-4-hexyl resorcinol
2,4-dialkyl resorcinols, e. g. di-secondary hexyl resorcinol,

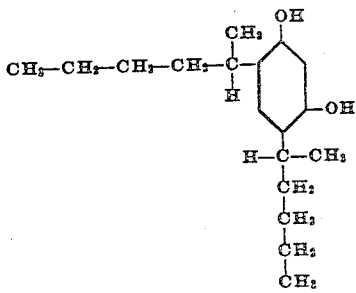

Hydroquinone:
    Methyl hydroquinone
    Ethyl hydroquinone
    Trimethyl hydroquinone
Leuco quinizarin:
    1,4-dihydroxy naphthalene
    2-methyl-1,4-dihydroxy napthalene
    4,4'-dihydroxy diphenyl ether
    Dibenzohydroquinone (dihydroanthraquinone)
    Dihydrophthiocol
Pyrogallol
Pyrogallol dimethyl ether
Hydroxy hydroquinone
Phloroglucinol
Gallic acid
Gallic acid methyl ester
Gallic acid ethyl ester
Pyrogallol carboxylic acid
Polygallic acids
Leuco flavorpurpurin
Leuco purpurin
Dihydroaurine
Aniline
N-methyl aniline
N-ethyl aniline
N-ethyl-toluidines
Diphenyl amine
p-Amino benzoic acid and its alkylaminoalkyl esters such as "novocain"
4-amino-1-naphthoic acid and its alkylaminoalkyl esters such as the β-diethylaminoethyl ester
N-acetyl-o-phenylene diamine
m-Phenylene diamine
m-Toluene diamine
p-Phenylene diamine
Benzidine
o, m, and p-Amino phenols
o, m, and p-N-alkyl phenols
Alkyl-amino phenols
Alkyl-amino phenols
Alkylaminoalkylamino phenols
1,4-amino-naphthol
2-methyl-4-amino-naphthol-1
2-methyl-4-hydroxy-naphthylamine-1
o, m, and p-Amino thiophenol
N-acyl-o, m, and p-amino thiophenol The above list of compounds illustrates the variety of substances which are stabilized against deterioration by use of the iminoaminomethanesulfinic acid compounds of the present invention. However, the amino compounds can also be stabilized in the form of their salts of non-oxidizing mineral or organic acids, as well as in the form of their free base compounds. Examples of salts of the above listed amino compounds which can be stabilized and which are salts of non-oxidizing mineral or organic acids are the sulfates, phosphates, sulfamates, hydrochlorides, hydrobromides, succinates, acetates, tartrates, citrates and like salts.

I have found that very small quantities of the stabilizer are necessary to obtain the desired effect, but exact quantities will vary with the different compounds to be stabilized. Quantities useful in solutions range from a small fraction of one per cent up to two or three per cent. I have found that when using aqueous solutions it is seldom necessary to use more than about 1% concentration of stabilizer. The iminoaminomethanesulfinic compounds of the invention are inexpensive and exercise their specific stabilizing action on the hydroxy, amino and hydroxyamino compounds of the invention in the presence of the pure, dry or liquid states of the latter, as well as in solutions of the same in organic or aqueous solvents and in mixtures which, in addition to the compound to be stabilized, also contain other organic or inorganic substances of non-oxidizing nature. In general, the presence of a reducing substance in mixtures which contain a hydroxy and/or amino compound to be stabilized has no effect upon the stabilizing effect of the iminoaminomethanesulfinate compounds of the invention.

The invention is illustrated by the following examples.

EXAMPLE I 1.1 g. of epinephrine is dissolved in 5.5 ml. of 4.2% hydrochloric acid and a solution of 0.1 g. of iminoaminomethanesulfinic acid dissolved in 25 ml. of water is added. 0.02 g. of p-tert.-octylphenoxyethoxyethyldimethylbenzylammonium chloride monohydrate and sufficient sodium chloride (about 0.5 g.) to render the solution isotonic at a volume of 100 ml. are added, the solution diluted to 100 ml. with distilled water and sterilized by filtration through a Mandler filter. The resulting water white solution has a pH of about 3 and is germicidal due to the added p-tert - octylphenoxyethoxyethyldimethylbenzylammonium chloride monohydrate. This solution of epinephrine hydrochloride is unchanged in color and activity after standing for several years while a control sample prepared in exactly the same manner but substituting 0.1 g. of sodium bisulfite for the iminoaminomethanesulfinic acid is dark brown in color and has only 75% of the original epinephrine activity at the end of this time.

EXAMPLE II 1 g. of epinephine is dissolved in 5 ml. of 4.2% hydrochloric acid and added to a solution of 1.0 g. of iminoaminomethanesulfinic acid in 33 ml. of distilled water. Sufficient sodium chloride (about 0.5 g.) to render the solution isotonic at a volume of 100 ml. is added, the solution diluted to 100 ml. with distilled water and sterilized by filtration through a Mandler filter. The resulting colorless solution is unchanged in color and epinephrine activity after aging for several years while an identical control sample prepared by substituting 1 g. of sodium bisulfite for the iminoaminomethanesulfinic acid is brown in color and loses a considerable percentage of the epinephrine activity.

EXAMPLE III 0.11 g. of epinephrine is dissolved in 0.7 ml. of 4.2% hydrochloric acid, the solution diluted to 10 ml. and added to a solution of 0.1 g. of iminoaminemethanesulfinic acid dissolved in 25 ml. of distilled water. The solution is diluted to 100 ml. with distilled water and sufficient sodium chloride (about 0.80 g.) to make the solution isotonic is added. This solution of epinephrine is colorless and retains all of its original epinephrine activity after standing for several years. A control sample in which sodium bisulfite is substituted for iminoaminosulfinic acid remains colorless under these conditions but loses 20% of its epinephrine activity.

EXAMPLE IV 0.011 g. of epinephrine is dissolved in 10 ml. of distilled water containing 0.07 ml. of 4.2% hydrochloric acid. This solution is added to a solution of 0.05 g. of iminoaminomethanesulfinic acid in 25 ml. of water. 0.80 g. of iminoaminomethanesulfinic acid in 25 ml. of water. 0.80 g. of sodium chloride is added and the solution diluted to 100 ml. with distilled water. This colorless solution of epinephrine hydrochloride maintains its color and activity over a period of several years whereas the control solution containing sodium bisulfite as a stabilizer instead of iminoaminomethanesulfinic acid rapidly loses its epinephrine activity.

EXAMPLE V 1 g. of the β-diethylaminoethyl ester of 4-amino-1-naphthoic acid is dissolved in a minimal amount of 2% hydrochloric acid and the resulting solution added to a solution of 0.1 g. of n-butylaminoiminomethanesulfinic acid in 50 ml. of water. About 0.5 g. of sodium chloride is added, the solution diluted to 100 ml. with distilled water and sterilized by filtration through a Mandler filter. This colorless solution does not darken on aging for several years or lose any appreciable amount of its local anesthetic activity, while a control sample prepared without a stabilizer becomes dark and rapidly loses its local anesthetic activity under the same conditions.

EXAMPLE VI 0.5 g. of ethyl p-aminobenzoate is dissolved in a minimal amount of 1% hydrochloric acid and the resulting solution added to a solution of 0.3 g. of iminoaminomethanesulfinic acid and 0.3 g. of 2-trichloromethyl-2-propanol in 50 ml. of distilled water. About 0.65 g. of sodium chloride is added, the solution diluted to 100 ml. and sterilized by filtration through a Mandler filter. This colorless solution retains all of its local anesthetic properties and is colorless even after standing exposed to the air for several years. The 2-trichloromethyl-2-propanol is added to this preparation solely for its germicidal properties.

EXAMPLE VII 0.1 g. of n-propylaminoiminomethanesulfinic acid is dissolved in 25 ml. of distilled water and added to a solution of 0.1 g. of β-diethylaminoethyl p-aminobenzoate and 0.8 g. of sodium chloride dissolved in 3.3 ml. of 4% hydrochloric acid and the resulting solution diluted to 100 ml. with distilled water. This colorless solution of β-diethylaminoethyl p-aminobenzoate is stable for several years whereas a control sample prepared without a stabilizer quickly deteriorates, losing its potency and turning dark in color.

EXAMPLE VIII 0.75 g. of iminoaminomethanesulfinic acid is dissolved in 9 ml. of 95% ethanol and the resulting solution added to 80 ml. of a saponified cresylic acid solution having a phenol coefficient of about 6.6. The resulting solution when diluted is valuable for use as a surgical and general disinfectant. The concentrated solution does not darken on exposure to air whereas a control sample prepared in the same manner but containing no iminoaminomethanesulfinic acid rapidly turns a dark brown color when exposed to the air.

EXAMPLE IX 0.2 g. of boric acid is dissolved in 30 ml. of glycerine by heating. The solution is cooled and added to a paste consisting of 0.23 g. of gum tragacanth, 0.53 g. of sodium alginate and 17 ml. of glycerine and the resulting mixture is stirred until a smooth paste is obtained. 300 ml. of water is added, the mixture heated to 185° F. for 20 minutes and then cooled. 0.34 g. of 2,4-di-sec-hexylresorcinol and 0.2 g. of iminoaminomethanesulfinic acid are added with stirring. The resulting mixture is suitable for a surgical lubricant and in spite of the fact that it contains 2,4-di-sec-hexylresorcinol, a very unstable compound, the preparation remains free from color over a period of several years.

I have also found that black spent wheat germ oil may be recovered by treatment of the crude oil with a small amount of ammonia and iminoaminomethanesulfinic acid to obtain a light yellow stable oil.

The iminoaminomethanesulfinic acid compounds of the present invention are prepared by the oxidation of the corresponding thioureas with hydrogen peroxide. Iminoaminomethanesulfinic acid, NH₂—C=NH—SO₂H, is prepared as described in U. S. Patent No. 2,150,921 while the N-substituted iminoaminomethanesulfinic acids are prepared in an analogous manner to those described in detail in the following specific examples:

EXAMPLE X

*Preparation of n-propylaminoiminomethanesulfinic acid*

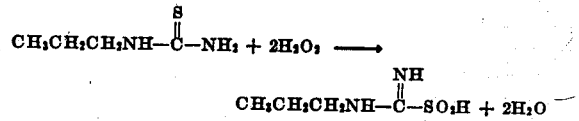

44 g. of n-propylthiourea is dissolved in 200 ml. of dioxane and 5 ml. of water. The mixture is cooled to about 0° C. By the addition of solid carbon dioxide and 25.4 g. (87.5 cc. of a 29% solution) of hydrogen peroxide added dropwise, with stirring keeping the temperature below 10° C. The reaction mixture is stirred at 10° C. for about two hours after all the hydrogen peroxide is added and then concentrated in vacuo. The yellow needles of the n-propylaminoiminosulfinic acid which separate are removed by filtration and washed with a small amount of absolute alcohol; M. P. 110–112° C. with effervescence to give a milky liquid.

A sample of this compound when dissolved in water absorbs iodine very slowly until a few drops of sodium acetate solution are added which immediately causes the disappearance of the iodine color.

EXAMPLE XI

*Preparation of n-butylaminoiminomethanesulfinic acid*

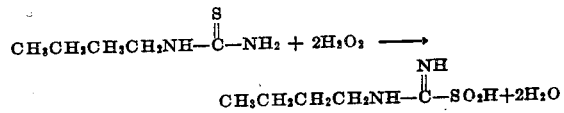

50 g. of n-butylthiourea is dissolved in a mixture of 20 ml. of water and 100 ml. of dioxane by warming. The solution is cooled to 0° C. and maintained below 10° C. while 89 cc. of 29% hydrogen peroxide solution is added dropwise with stirring. Stirring is continued for about two hours after all the hydrogen peroxide has been added and then the solid product removed by filtration. The crude n-butylaminoiminomethanesulfinic acid is recrystallized from water; M. P. 126° C. with effervescence. To prevent decomposition of the product during recrystallization, it is advisable to use sufficient water to effect solution of the material at about 50° C.

The iminoaminomethanesulfinic acid compounds which I use as stabilizers are non-toxic and are well tolerated when administered to animals or humans by the subcutaneous, intravenous or intramuscular routes as well as by the oral route. More particularly, these iminoaminomethanesulfinic acid compounds are at least as non-toxic as sodium bisulfite. For example, the oral toxicity data of iminoaminomethanesulfinic acid in mice are: M. T. D. (maximum tolerated dose) 600 mg./kg. and M. L. D. (minimum lethal dose) 750 mg./kg., while the corresponding toxicity data for sodium bisulfite are: M. T. D. 750 mg./kg. and M. L. D. 900 mg./kg.

I have found that the iminoaminomethanesulfinic acid compounds which I use are at least twice as effective as sodium bisulfite when used to prevent deterioration or alteration of the various unstable products mentioned herein.

I claim:

1. A stabilized aromatic carbocyclic compound containing a nuclear substituent of the class consisting of hydroxyl and amino groups and acid addition salt groups corresponding to said amino groups, said carbocyclic compound having incorporated therewith at least a small fraction of 1% of an iminoaminomethanesulfinic acid of the formula,

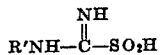

to stabilize said carbocyclic compound against deterioration, R' of the formula being a member of the class consisting of hydrogen and lower alkyl radicals.

2. A stabilized aromatic carbocyclic compound containing a nuclear substituent of the class consisting of hydroxyl and amino groups and acid addition salt groups corresponding to said amino groups, said carbocyclic compound having incorporated therewith at least a small fraction of 1% of iminoaminomethanesulfinic acid of the formula,

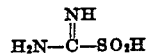

to stabilize said carbocyclic compound against deterioration.

3. A stabilized aromatic carbocyclic compound containing a nuclear hydroxyl group, said carbocyclic compound having incorporated therewith at least a small fraction of 1% of an iminoaminomethanesulfinic acid of the formula,

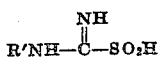

to stabilize said carbocyclic compound against deterioration, R' of the formula being a member of the class consisting of hydrogen and lower alkyl radicals.

4. A stabalized benzene compound containing a nuclear substituent of the class consisting of hydroxyl and amino groups and acid addition salt groups corresponding to said amino groups, said phenolic compound having incorporated therewith at least a small fraction of 1% of an iminoaminomethanesulfinic acid of the formula,

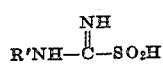

to stabilize said phenolic compound against deterioration, R' of the formula being a member of the class consisting of hydrogen and lower alkyl radicals.

5. A stabilized phenol having incorporated therewith at least a small fraction of 1% of iminoaminomethanesulfinic acid to stabilize said phenol against deterioration.

6. A stabilized phenol having incorporated therewith at least a small fraction of 1% of n-propylaminoiminomethanesulfinic acid of formula,

to stabilize said phenol against deterioration.

7. A stabilized phenol having incorporated therewith at least a small fraction of 1% of n-butylaminoiminomethanesulfinic acid of formula,

to stabilize said phenol against deterioration.

8. A stabilized aqueous solution of an aromatic carbocyclic compound containing a nuclear substituent of the class consisting of hydroxyl and amino groups and acid addition salt groups corresponding to said amino groups, said carbocyclic compound having incorporated therewith at least a small fraction of 1% of an iminoaminomethanesulfinic acid of the formula,

to stabilize said carbocyclic compound against deterioration, R' of the formula being a member of the class consisting of hydrogen and lower alkyl radicals.

9. A stabilized aqueous solution of an aromatic carbocyclic compound containing a nuclear substituent of the class consisting of hydroxyl and amino groups and acid addition salt groups corresponding to said amino groups, said carbocyclic compound having incorporated therewith at least a small fraction of 1% of an iminoaminomethanesulfinic acid of the formula,

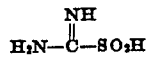

to stabilize said carbocyclic compound against deterioration.

10. A stabilizer aqueous solution of stabilized aromatic carbocyclic compound containing a nuclear hydroxyl group, said carbocyclic compound having incorporated therewith at least a small fraction of 1% of an iminoaminomethanesulfinic acid of the formula, $$R'NH-\underset{\underset{NH}{\parallel}}{C}-SO_2H$$

to stabilize said carbocyclic compound against deterioration, R of the formula being a member of the class consisting of hydrogen and lower alkyl radicals.

11. A stabilized aqueous solution of a benzene compound containing a nuclear substituent of the class consisting of hydroxyl and amino groups and acid addition salt groups corresponding to said amino groups, said carbocyclic compound having incorporated therewith at least a small fraction of 1% of an iminoaminomethanesulfinic acid of the formula, $$R'NH-\underset{\underset{NH}{\parallel}}{C}-SO_2H$$

to stabilize said carbocyclic compound against deterioration, R' of the formula being a member of the class consisting of hydrogen and lower alkyl radicals.

12. A stabilized aqueous solution of a phenol having incorporated therewith at least a small fraction of 1% of iminoaminomethanesulfinic acid to stabilize said phenol against deterioration.

13. A stabilized aqueous solution of a phenol having incorporated therewith at least a small fraction of 1% of n-propylaminoiminomethanesulfinic acid of the formula, $$CH_3CH_2CH_2NH-\underset{\underset{NH}{\parallel}}{C}-SO_2H$$

to stabilize said phenol against deterioration.

14. A stabilized aqueous solution of a phenol having incorporated therewith at least a small fraction of 1% of n-butylaminoiminomethanesulfinic acid of formula, $$CH_3CH_2CH_2CH_2NH-\underset{\underset{NH}{\parallel}}{C}-SO_2H$$

to stabilize said phenol against deterioration.

15. The method of stabilizing an aromatic carbocyclic compound and compositions containing the same against deterioration, said compound containing a nuclear substituent of the class consisting of hydroxyl and amino groups and acid addition salt groups corresponding to said amino groups, which comprises incorporating therewith at least a small fraction of 1% of $$R'NH-\underset{\underset{NH}{\parallel}}{C}-SO_2H$$

R' of the formula being a member of the class consisting of hydrogen and lower alkyl radicals.

16. The method of stabilizing an aromatic carbocyclic compound and compositions containing the same against deterioration, said compound containing a nuclear substituent of the class consisting of hydroxyl and amino groups and acid addition salt groups corresponding to said amino groups, which comprises incorporating therewith at least a small fraction of 1% of iminoaminomethanesulfinic acid of the formula, $$H_2N-\underset{\underset{NH}{\parallel}}{C}-SO_2H$$

17. The method of stabilizing an aqueous solution of a phenol against deterioration which comprises incorporating therewith at least a small fraction of 1% of iminoaminomethanesulfinic acid of the formula, $$H_2N-\underset{\underset{NH}{\parallel}}{C}-SO_2H$$

18. The method of stabilizing an aqueous solution of a phenol against deterioration which comprises incorporating therewith at least a small fraction of 1% of n-propylaminoiminomethanesulfinic acid of the formula, $$CH_3CH_2CH_2NH-\underset{\underset{NH}{\parallel}}{C}-SO_2H$$

19. The method of stabilizing an aqueous solution of a phenol against deterioration which comprises incorporating therewith at least a small fraction of 1% of n-butylaminoiminomethanesulfinic acid of the formula, $$CH_3CH_2CH_2CH_2NH-\underset{\underset{NH}{\parallel}}{C}-SO_2H$$

EDWARD W. TILLITSON.

REFERENCES CITED

The following references are of record in the file of this patent:

UNITED STATES PATENTS

| Number | Name | Date |
| --- | --- | --- |
| 2,047,144 | Kharasch | July 7, 1936 |
| 2,130,322 | Kharasch | Sept. 13, 1938 |
| 2,347,446 | Walker | Apr. 25, 1944 |